May 31, 1966    A. VAN GELDER    3,253,344
DEHYDRATING PROCESS USING ELECTRO-MAGNETIC INDUCTION HEATING
Filed Dec. 3, 1962
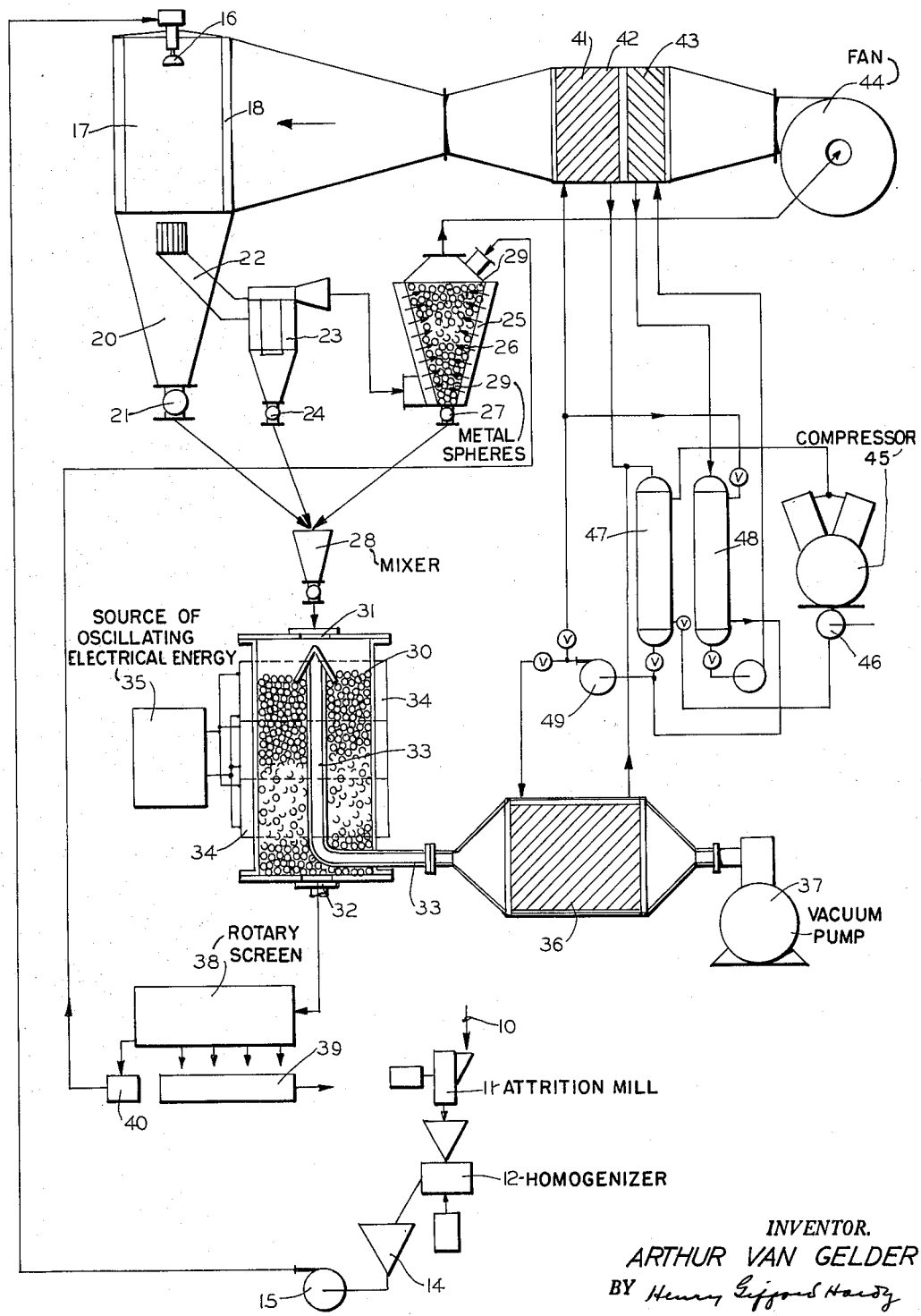
INVENTOR.
ARTHUR VAN GELDER
BY Henry Gifford Hardy
ATTORNEY

United States Patent Office 3,253,344
Patented May 31, 1966

3,253,344
DEHYDRATING PROCESS USING ELECTRO-
MAGNETIC INDUCTION HEATING
Arthur van Gelder, Vacaville, Calif.
(409 W. Aliso St., Ojai, Calif.)
Filed Dec. 3, 1962, Ser. No. 241,921
8 Claims. (Cl. 34—5)

This invention relates in general to a dehydrating process, and more specifically to the process of freeze vacuum drying of solutions, suspensions, colloidal suspensions and pulps.

The process of the present invention has particular application in the dehydration of fruit juices and other liquids containing suspended or colloidal solids, whereby the liquid is transformed into a dried powder-like substance for facilitating shipping and storing, and which may be easily reconstituted with cold or hot water to provide the properties and characteristics of the original liquid.

It is therefore an object of the present invention to provide a process for the dehydration of solutions, colloidal suspensions and pulps.

It is another object of the present invention to provide a process for the freeze vacuum drying of solutions, colloidal suspensions and pulps, whereby the freeze vacuum drying is performed more economically and at a higher rate of output than prior processes.

A further object of the present invention is to provide a process for producing a dehydrated product in the form of dried powder or small particles which have substantially the same properties as the original product, after reconstitution with cold or hot water.

Yet another object of the present invention is to provide a process for the dehydration of products, such as solutions, colloidal suspensions and pulps, whereby the product is frozen prior to dehydration to provide a porous end product which is easily reconstituted in cold or hot water.

A still further object of the present invention is to provide a process for the dehydration of products at a greatly increased dehydration rate over prior processes to provide an end product having a low bulk density.

Another object of the present invention is to provide a freeze vacuum drying process for the dehydration of any solution, colloidal suspension or pulp, by means of sublimation at low pressures under the influence of induction heating.

It is a still further object of the present invention to provide a process for the freeze vacuum drying of a product, wherein the product is divided into extremely small particles and frozen in the form of a dried powder in order to present a very large surface area of the product for the application thereto of an induction heated medium in close and intimate contact with the product to thereby provide a process having a greatly increased dehydration rate over prior processes.

Another object of the invention is to provide a process which employs familiar techniques similar to those of freeze vacuum drying but where the dehydration is accomplished by applying an induction heated medium in close contact with the product, thus providing an increased evaporation rate and simplicity in the cleaning of the equipment over known methods.

It is a further object to provide a method which is equally available for batch or continuous operation.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

In the drawing, the single figure of the drawing is a schematic diagram of apparatus for carrying out the process of the prevent invention.

The present invention provides a process and apparatus for the dehydration of products such as solutions, suspensions, colloidal suspensions, and pulps of any kind, by subjecting such products to a series of steps to transform the same into a dried powder-like end product which can be reconstituted with either cold or hot water into a form having substantially the same properties as the original product. For example, if the product to be dehydrated is orange juice, the dried powder would be reconstituted with cold water in order to provide a mixture having substantially the same taste, coloring, texture and vitamin content as the original orange juice.

Initially it is desirable to prepare the product to bring it into a state of solution, suspension, colloidal suspension, and/or pulp, consisting of finely divided solids and liquids. Thus, if the end product is dehydrated orange juice, the juice is prepared by conventional squeezing. Products capable of being processed by the method disclosed herein need not be limited to products brought into a state of solution, but also includes concentrations of such products where part of the moisture or other substances have been previously removed, and larger particles or chunks of the products.

The second step of the process consists of dividing the product into small particles preferably by introducing the product into any type of commercially available spraying equipment by means of nozzles or rotating disks, bowls, or rotors of any size or shape capable of dividing the product into small particles.

The third step of the process is to freeze the small particles of the product to produce a powdered snow-like product. The third step may be combined with the second step by locating the spraying equipment inside of a chamber and subjecting the particles to a flow of cold gases having a temperature sufficient to freeze the particles substantially instantaneously upon contact therewith. An alternate method of freezing is to bring the particles into intimate contact with cold surfaces which are maintained at a sufficient temperature to cause the particles to freeze while the particles are being constantly agitated to prevent their sticking to the surfaces. The prepared material can also be frozen by immersion into a cryogen and then pulverized into powdered form, although this adds an extra step. Any method of quick freezing is entirely satisfactory which will produce a frozen powder or snow-like product.

The next step in the process is introducing the frozen particles into a low temperature mixing chamber containing small pieces of metal, preferably in the form of spheres or balls, which may be made of any suitable metal and are preferably coated with Teflon which is polyfluorovinyl resin, a product of the E. I. du Pont Company, or any other suitable type of material to prevent the frozen particles from sticking to the metal or the coating. The mixing chamber and metal spheres or balls are preferably cooled to a temperature below freezing point of the particles before the particles are introduced in order to prevent the particles from melting upon coming into contact with the spheres. The spheres and the frozen particles may be thoroughly agitated (though this is not necessary) to further prevent the frozen particles from sticking to the spheres during the period of residence. It is also possible to combine this step with the previous step, in that the particles may be frozen while spheres are being cooled in the same mixer, during which time the mixer is agitated in order to keep the particles from sticking to the spheres until the particles are frozen, at which time the agitation of the mixer continues to thoroughly distribute the spheres throughout the frozen particles.

In the next step of the process the frozen particles and spheres are introduced into a chamber in which a high vacuum is drawn. While the frozen particles and the spheres are being subjected to the high vacuum, the spheres are subjected to electro-magnetic forces which will produce induction heat in the spheres, and this heat is transferred to the frozen particles by means of conduction and radiation. This heating of the particles creates a differential vapor pressure between the particles and the vacuum which effects evaporation of the moisture in the particles and results in their dehydration. It will be appreciated that the intimate contact between the frozen particles and the spheres causes a uniform heat transfer from the spheres to the frozen particles, thereby resulting in rapid dehydration of the particles. It has been found that this process enables a much greater quantity of material per unit volume to be processed than normally found in freeze vacuum drying due primarily to the intimate contact between the spheres and the frozen particles to thereby make the process of the present invention much more economical than other processes heretofore used.

The final step in the process is releasing frozen particles and spheres from the vacuum chamber and screening the frozen particles from the spheres. The frozen particles are then packed or subjected to further treatment, as may be desired, and the spheres are preferably cleaned and returned to a suitable receptacle for reuse.

The essential elements of this process can be applied to products having a larger particle size and not in the form of suspensions, colloidal suspensions and pulps. Also, while the dehydration described takes place in the presence of a pressure lower than atmospheric, simple dehydration by induction heated means at atmospheric pressure is included.

Referring now to the single figure of the drawing, there is shown in diagrammatic form exemplary apparatus for carrying out the above-described process. The product 10, for example, orange juice with its natural pulp, is fed into a primary attrition mill 11, where the solids are reduced to finely divided form. The juice and finely comminuted solids is then fed into a homogenizer or colloid mill 12, where it is converted to a suspension which then flows into a holding tank 14 from which it is pumped by a suitable proportioning pump 15 for delivering a controlled quantity to the atomizer 16. The control is necessary in order not to feed material in excess of the capacity to freeze instantly. The atomizer 16 is preferably a high-speed rotary atomizer capable of dividing the fluid into small particles. The atomizer 16 is located within a cylindrical chamber 17 into which cold air or a similar type gas is tangentially introduced as at 18 to cause a spirally rotating pattern within the chamber. Air is the gas most frequently used, although liquid nitrogen or nitrous oxide may be used in a closed system. The air as introduced is pre-cooled to a temperature of well below 0° F. by apparatus to be hereinafter described, so that as the small particles of the product contact the cold air they are substantially instantaneously frozen. The frozen particles spiral downwardly by gravity into the conically shaped bottom portion 20 of the chamber 17 and are discharged through an air-locking device or star valve 21. The cold air or other gas is discharged from the chamber 17 by means of a duct 22 and passes through a separator 23 where any remaining particles of frozen products entrained with the air flow are separated from the cold air and removed from the separator 23 by means of a star valve 24 at the bottom of the separator 23. The cold air discharged from the separator 23 is delivered into a chamber 25 having an internal perforated jacket 26 which is filled with the small metal spheres or balls 29 previously described. Any conductive metal is available for making the spheres 29, and they are preferably coated with Teflon, a polyfluorovinyl resin, a product of the E. I. du Pont Company, or other suitable material as before described.

An exact quantity of metal spheres is measured out of the chamber 25 by means of a star valve 27, and along with the frozen particles from the valve 21 and the valve 24, are fed into a mixer 28. The ratio of spheres or balls 29 to the powdered product is such that the spheres will occupy forty-two percent of the space within the chamber 30. The frozen particles and the metal spheres are thoroughly agitated in the mixer 28 and then are discharged into the vacuum apparatus, which consists of a cylindrical chamber 30, an entrance passage 31 and a discharge passage 32. A perforated pipe 33 is centrally located within the chamber 30 for drawing off the gases and vapor from the chamber 30. An induction coil 34 surrounds the chamber 30 and is of sufficient size to adequately heat the metal spheres inside the chamber 30 by induction. A source of oscillating electrical energy 35 is operably connected to the induction coil 34 and is adapted to vary the intensity of the magnetic field and the frequency of the electric oscillation within the coil 34. A condenser 36 is operably connected to the pipe 33 for condensing the water vapors exhausted therethrough. A vacuum pump 37 is operably connected to the condenser 36 for maintaining a high vacuum within the system. When the frozen particles and the metal spheres have filled the chamber 30, the chamber is sealed and subjected to a vacuum to produce a temperature within the chamber of well below zero degrees Fahrenheit. The induction coils 34 are energized to heat the metal spheres and to consequently heat the frozen particles by conduction and radiation due to the intimate contact between the frozen particles and the metal spheres. As the current fluctuates the polarity of the field reverses causing the reorientation of the molecular structure in the spheres to produce an internal induction heat within the spheres. The induction coils 34 are controlled to keep the temperature of the frozen particles below their freezing point during the initial dehydration of the particles. After the frozen particles have lost most of their moisture content, the temperature of the frozen particles will tend to rise above their freezing point, and it is obvious that this temperature rise must be very carefully followed and the heat of induction correspondingly reduced in order to prevent the frozen particles from melting.

When the frozen particles are dehydrated to the desired moisture content depending upon the product requirement, the particles and the spheres are discharged from the vacuum chamber 30 through the passage 32 and are fed to a suitable rotary screen 38 for separating the metal spheres from the dehydrated particles. The dehydrated particles are then discharged from the screen 38 to a suitable container 39 for packing or further processing, while the metal spheres 29 are discharged into a suitable cleaning apparatus 40 and are returned to the perforated jacket 26 in chamber 25 for reuse.

The air or gases which are supplied to the freezing chamber 17 are cooled by means of one or more refrigerated coils 41 which are maintained in a suitable chamber 42 at a temperature well below freezing. A secondary refrigerated coil 43 is maintained at a temperature just above freezing to remove excess moisture from the air which would otherwise accumulate in considerable quantity on the freezing coil 41. A suitable fan 44 provides the required air volume and pressure, and has its outlet end operably connected to the chamber 42, and its inlet end to the outlet of the cooler 25, thereby making the entire cooling system one continuous unit.

The refrigeration for the process is supplied by a refrigeration compressor 45 operably connected to a refrigeration condenser 46 which is cooled either by air, water or by evaporation. The refrigerant is circulated through a heat exchanger 47 containing brine which is pumped by pump 49 to the condenser 35 and to the cooling chamber 42. A secondary heat exchanger 48 is also provided for pumping brine to the secondary cooling coil 43. The quantity of brine pumped to each of the aforementioned cooling coils is carefully controlled by means of suitable thermostats operating conventional valves so as to provide the proper amont of refrigeration in the various components performing the various steps of the process.

While the induction heated material has been described as metal spheres which are of the order of ¼ inch to ½ inch in diameter, the shape is not essential and the size may be any suitable size.

I claim:

1. The method of dehydrating compositions containing solids and liquids, comprising the steps of reducing the solids in the composition to a finely divided state in suspension, dividng the compostion into small particles, instantaneously freezing the particles to produce a frozen powder, introducing the frozen powder into a mixer containing a controlled amount of Teflon coated metal spheres which have previously been cooled to a temperature below the freezing point of the composition and mixing the same, subjecting the frozen particles and metal pieces in a substantially static condition to a vacuum, heating the particles to thereby create a differential vapor pressures between the particles and the vacuum to cause evaporation of the moisture in the frozen particles resulting in dehydration thereof, withdrawing the moisture vapor, and separating the dehydrated particles from the metal spheres at atmospheric pressure.

2. The method of dehydrating compositions consisting of solids and liquids, comprising the steps of reducing the composition to a solution with the solids in finely divided form, spraying the composition at a controlled rate into a chamber containing air which has been pre-cooled to below the freezing point of the composition to thereby change the composition into small frozen particles, introducing the small frozen particles into a mixer containing small metal balls which have been pre-cooled to maintain the temperature of the frozen particles below the freezing point of the frozen particles, said metal balls constituting not more than 42% of the total volume, introducing the frozen particles and Teflon coated metal balls into a vacuum chamber which is cooled to produce a temperature in the frozen particles below their freezing point, subjecting the metal balls in static condition to a varying electro-magnetic field to thereby produce heat within the metal balls, which heat is transferred to the frozen particles by conduction and radiation to raise the temperature of the frozen particles to not more than 30° F., the rise in temperature of the frozen particles producing a differential vapor pressure between the frozen particles and the vacuum to cause evaporation of the moisture by sublimation in the frozen particles resulting in the dehydration thereof, and separating the dehydrated frozen particles from the metal balls.

3. The method of dehydrating compositions consisting of solids and liquids, comprising the steps of reducing the composition to a solution with solids in a finely divided form, introducing this composition mixed with small Teflon coated metal balls into a vacuum chamber, drawing a vacuum in the chamber to reduce the boiling point of the composition, subjecting the metal balls to a varying electro-magnetic field to thereby produce heat within the metal balls, and raising the temperature of the composition to its boiling point as determined by the pressure within the vacuum chamber, all in static condition to dehydrate the same by heat transferred to the composition by conduction, convection and radiation.

4. The method of dehydrating compositions consisting of solids and liquids, comprising the steps of reducing the composition to small pieces of any desired shape, freezing these pieces, introducing the frozen pieces mixed with small Teflon coated metal balls pre-cooled to a compatible temperature into a vacuum chamber having a temperature below the freezing point of the composition, drawing a high vacuum within the chamber, subjecting the metal balls in static condition to a varying electro-magnetic field, to thereby produce heat within the metal balls which heat is transferred to the frozen particles by conduction and radiation to raise the temperature of the frozen pieces to not more than 30° F., the rise in temperature of the frozen pieces producing a differential vapor pressure between the frozen pieces and the vacuum to cause evaporation of the moisture by sublimation, withdrawing the moisture from the chamber, and separating the dehydrated particles from the metal balls.

5. The method of dehydrating compositions containing solids and liquids, comprising the steps of reducing the solids in the composition to a finely divided state in suspension, dividing the composition into small particles, instantaneously freezing the particles to produce a frozen powder, introducing the frozen powder into a mixer containing a controlled amount of Teflon coated metal spheres which have previously been cooled to a temperature below the freezing point of the composition and mixing the same, subjecting the frozen particles and metal spheres in a substantially static condition to a vacuum, heating the metal spheres by oscillating electrical induction and transmitting the heat to the frozen particles by conduction and radiation to thereby create a differential vapor pressure between the particles and the vacuum to cause evaporation of the moisture in the frozen particles resulting in dehydration thereof, withdrawing the moisture vapor, and separating the dehydrated particles from the coated metal spheres at atmospheric pressure.

6. The method of dehydrating compositions containing solids and liquids, comprising the steps of reducing the solids in the composition to a finely divided state in suspension, dividing the composition into small particles, instantaneously freezing the particles to produce a frozen powder, introducing the frozen powder into a mixer containing a controlled amount of Teflon coated metal spheres which have previously been cooled to a temperature below the freezing point of the composition and mixing the same, subjecting the frozen particles and metal spheres in a substantially static condition to a vacuum, heating the metal spheres by oscillating electrical induction and transmitting the heat to the frozen particles by conduction and radiation to thereby create a differential vapor pressure between the particles and the vacuum to cause evaporation of the moisture in the frozen particles resulting in dehydration thereof, controlling the electrical induction heating at all times to maintain the temperature of the frozen particles below 31° F., withdrawing the moisture vapor, and separating the dehydrated particles from the coated metal spheres at atmospheric pressure.

7. In the dehydration of compositions the steps of preparing a frozen snow-like powder of the material to be dehydrated, mixing the frozen powder with electrically conductive metal spheres coated to prevent the powder from sticking thereto and cooled to a temperature below the freezing point of said powder, subjecting the mixture in a static condition to a pressure lower than atmospheric, heating the metal spheres by oscillating induction causing the powder to give up its water content in the form of vapor, removing the water vapor, and separating the dehydrated product from the said spheres at atmospheric pressure.

8. In the dehydration of compositions the steps of preparing a frozen snow-like powder of the material to be dehydrated, mixing the frozen powder with electrically conductive metal spheres coated to prevent the powder from sticking thereto and cooled to a temperature below the freezing point of said powder in the proportion that the metal spheres are not more than 42% of the total volume, subjecting the mixture in a static condition to a pressure lower than atmospheric, heating the metal spheres by oscillating induction causing the powder to give up its water content in the form of vapor, removing the water vapor and separating the dehydrated product from the said spheres at atmospheric pressure.

References Cited by the Examiner

UNITED STATES PATENTS

| | | | |
|---|---|---|---|
| 1,701,156 | 2/1929 | Heritage | 34—1 |
| 2,038,251 | 4/1936 | Vogt. | |
| 2,344,754 | 3/1944 | Vang | 34—1 |
| 2,388,917 | 11/1945 | Hormel | 34—5 |
| 2,552,360 | 5/1951 | Zichis | 34—5 X |
| 2,841,339 | 7/1958 | Gilmore | 34—5 |
| 3,024,117 | 3/1962 | Barlow | 62—74 X |

ROBERT A. O'LEARY, *Primary Examiner.*

NORMAN YUDKOFF, *Examiner.*